United States Patent
Agrawal et al.

(10) Patent No.: US 8,135,821 B2
(45) Date of Patent: Mar. 13, 2012

(54) VALIDATION OF MODULE INTEROPERABILITY

(75) Inventors: Dakshi Agrawal, Monsey, NY (US); Seraphin B. Calo, Cortlandt Manor, NY (US); Murthy Devarakonda, Peekskill, NY (US); David A. George, Somers, NY (US); Sandeep K. Gopisetty, Morgan Hill, CA (US); Kang-Won Lee, Nanuet, NY (US); Konstantinos Magoutis, New York, NY (US); Ramani R. Routray, San Jose, CA (US); Joseph D. Ryan, Coronado, CA (US); Gauri Shah, Santa Clara, CA (US); Chung-hao Tan, San Jose, CA (US); Norbert G. Vogl, Mahopac, NY (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 11/623,452

(22) Filed: Jan. 16, 2007

(65) Prior Publication Data

US 2008/0172480 A1    Jul. 17, 2008

(51) Int. Cl.
*G06F 15/173* (2006.01)
(52) U.S. Cl. ......... 709/224; 709/205; 709/221; 709/226
(58) Field of Classification Search ........... 709/223–226
See application file for complete search history.

(56) References Cited

U.S. PATENT DOCUMENTS

| 6,094,688 A * | 7/2000 | Mellen-Garnett et al. .... 719/328 |
| 7,512,595 B1 * | 3/2009 | McBride et al. .................. 707/3 |
| 2005/0185597 A1 * | 8/2005 | Le et al. ........................ 370/254 |

* cited by examiner

*Primary Examiner* — Ian N Moore
*Assistant Examiner* — Jackie Zuniga
(74) *Attorney, Agent, or Firm* — Ryan, Mason & Lewis, LLP (57) ABSTRACT

A method for validating that a networked system of modules conforms to at least one interoperability rule pertinent to interoperability of at least two of the modules includes the steps of obtaining the at least one interoperability rule, the at least one rule being encoded in computer-operable format; obtaining configuration information pertinent to at least one of the modules, the configuration information being encoded in computer-operable format; and comparing the at least one interoperability rule to the configuration information to validate whether the system conforms to the at least one interoperability rule 23 Claims, 6 Drawing Sheets

VALIDATION OF MODULE INTEROPERABILITY

FIELD OF THE INVENTION

The present invention relates to the field of networked systems. In particular, it relates to validation of the interoperability of a system of networked modules.

BACKGROUND OF THE INVENTION

Networked systems are becoming both increasingly prevalent and increasingly complex. Frequently, they encompass a large number of diverse modules; accordingly, the potential for incompatibility issues to arise grows ever greater. These problems can often to lead to system failures or other forms of abnormal operation. They are often difficult to diagnose when they occur and even more difficult to predict prior to deployment.

In the field of computing, there are an increasing number of computing modules (for example distributed services, workstations, file/database servers, storage systems, printers, and the like) being connected with each other through a network. Such modules may be software components such as web services or software libraries, or hardware components such as network interfaces or storage controllers. An example of the former can be found in a travel reservation service, which may comprise a front-end module that provides a uniform presentation to its users and back-end service modules that are in charge of flight reservation, hotel reservation, rental car reservation, and checking for travel policies applicable to the user. An example of the latter can be found in a networked storage system, where a group of servers share storage devices via a high-speed switching fabric. Often, software modules and hardware modules have interoperability rules, for example a certain version of software modules will only work with a set of hardware modules only.

To enable interoperation between computing modules, standardized protocols for networking, such as Simple Object Access Protocol (SOAP), transfer control protocol/Internet protocol (TCP/IP), Fiber Channel, and small computer system interface (SCSI), have been proposed in web services, internet, storage area network, and device interconnections, respectively. While such standards help interoperability among peer computing modules, they are not designed to address interoperability among computing modules that are not peers of each other. Furthermore, the interoperation between any two computing modules is not always warranted. For example, certain technical areas, such as networked storage systems, have a relatively short history and are rapidly evolving, thus resulting in inconsistent implementation of standards where standards exist at all. As a result, it may be important to ensure that all devices in a networked system will work together when developing with a new configuration or changing an existing configuration by adding, removing, or reconfiguring modules.

To illustrate the problem, we take an example from the management of storage area networks (SAN). Currently, each vendor publishes lengthy documents which contain the interoperability rules for each storage device and each SAN switch product they sell. Such a document typically lists all the devices that have been tested and are known to work with the corresponding device. Human administrators who manage networked storage systems use these documents as reference manuals for designing and troubleshooting. In such documents, interoperability rules may be represented in plain English as well as in a table format. These restrictions may include the version of firmware that is recommended for particular server/storage combination, and such recommendations as "both tape and disk should not be attached to the same host bus adapter (HBA)," and the like. These interoperability rules arise despite various standards, for example Internet Small Computer System Interface (iSCSI), Network File System (NFS), and Common Internet File System (CIFS) for connecting SAN devices.

At present, a majority of networked storage systems are designed by SAN experts or technical consultants. When these human experts design a storage system, they must consider existing devices (such as hosts and servers if there are any) and determine the types and the number of storage systems and how to configure those storage systems using SAN switches. In this process, the human expert will have to refer to the interoperability documents to identify candidate devices and decide which devices are appropriate. In many practical scenarios, the experts may decide to buy all systems from a single vendor to eliminate the possibility of configuration problems. However, this certainly limits the available choices for the user and the user will tied to a particular manufacturer in the future. Overall, this manual process for SAN design will likely result in suboptimal and expensive design. It is also possible, that the expert may in fact misinterpret the information in the interoperability document and misconfigure the system, which will later take a lot of time to fix, and result in lost or below par services.

There are tools that to help human SAN designers take the information on host devices, storage devices, and SAN switches as input from the user and display a resulting configuration. Although these software tools are useful and some of them provide primitive solutions to device interoperation checking, they can check the relation of only a fixed set of devices using a fixed set of configuration rules, which have been provided by the software vendor.

It would thus be desirable to overcome the limitations in previous approaches.

SUMMARY OF THE INVENTION

Principles of the present invention provide techniques for validating module interoperability. In one aspect, an exemplary computer-implemented method includes the steps of obtaining at least one interoperability rule pertinent to interoperability of at least two of the modules, the at least one rule being encoded in computer-operable format; obtaining configuration information pertinent to at least one of the modules, the configuration information being encoded in computer-operable format; and comparing the at least one interoperability rule to the configuration information to validate whether the system conforms to the at least one interoperability rule.

This method may be implemented within one or more modules whose interoperability is being examined or within one or more other modules connected either directly or via network to the modules being examined. The modules being examined may have already been deployed or may represent a proposed new or modified configuration not yet implemented.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

These and other features, aspects, and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described herein in the context of exemplary methods and apparatus for validation of module interoperability. It is to be understood, however, that the techniques of the present invention are not limited to the methods and apparatus shown and described herein. Moreover, although the embodiments disclosed in this specification primarily address networks composed of computing modules, the principles of this invention can be applied to any network of diverse components having interoperability rules, including by way of example those used in communications and transportation.

Figure 1:
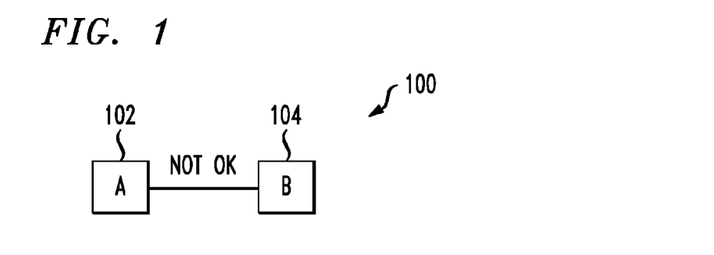
FIG. 1 is a simplified block diagram illustrating an exemplary interoperability rule.

FIG. 1 is a simplified block diagram illustrating an exemplary interoperability rule 100, namely when module A, designated as 102, and module B, designated as 104, cannot be attached together. For example, in the context of a remote procedure call, this may represent a scenario where a caller invokes a function that does not match the function signature (that is number of parameters and their respective type) of the callee. This type of conflict may occur due to deploying an incorrect version of software or changing either caller or callee but failing to upgrade the other party.

Figure 2:
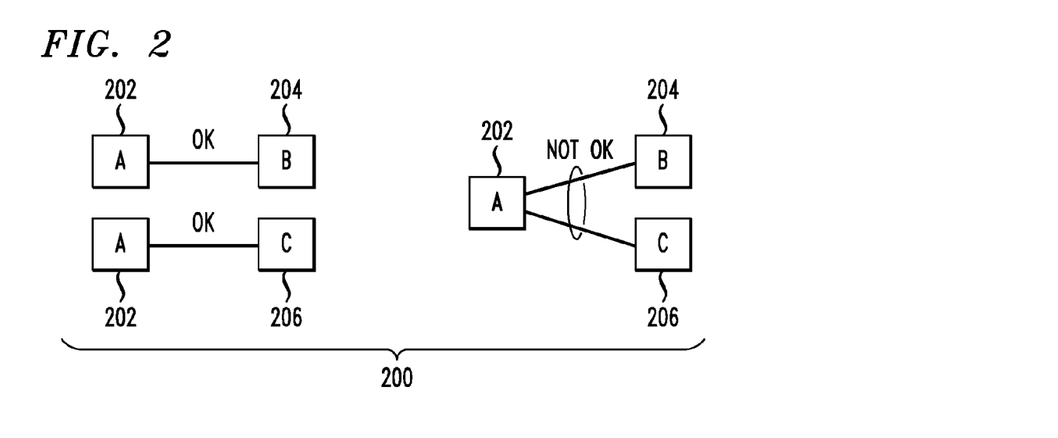
FIG. 2 is a simplified block diagram illustrating an exemplary interoperability rule.

FIG. 2 is a simplified block diagram illustrating an exemplary interoperability rule 200, namely when module A, designated as 202, can work with either module B, designated as 204, or module C, designated as 206, but cannot work with both modules B and C in the same configuration. For example, in a storage area network (SAN), certain types of HBAs should not be configured in the same zone as both a disk and a tape device, although it may very well work with either disk or tape. In SAN management, this is one of the most common misconfiguration problems.

Figure 3:
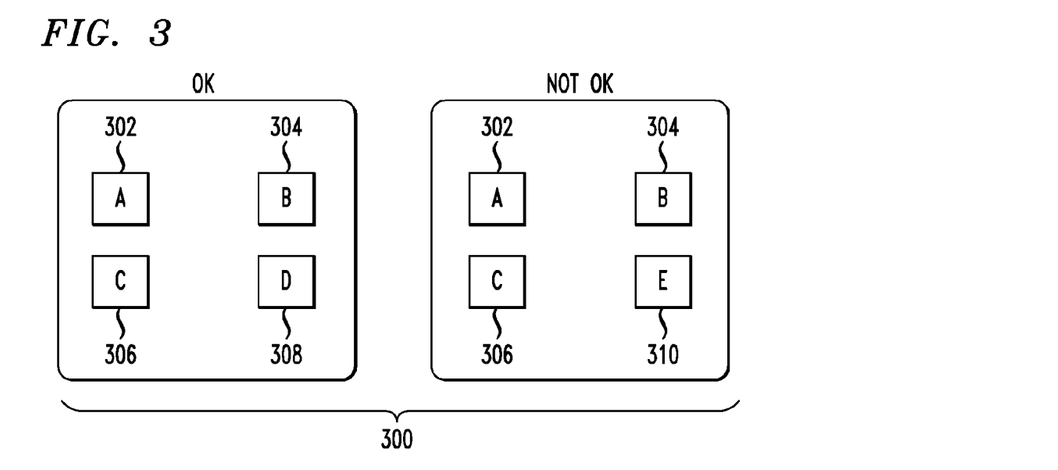
FIG. 3 is a simplified block diagram illustrating an exemplary interoperability rule.

FIG. 3 is a simplified block diagram illustrating an exemplary interoperability rule 300, namely when modules A, B, C, D, designated respectively as 302, 304, 306 and 308, can co-exist in a configuration but module E, designated as 310, cannot co-exist with them. For example, in a storage area network, a SAN administrator may want to separate Windows® servers and UNIX® servers in different zones for administrative purposes. In this case, Windows® NT, 2000, 2003, and XP machines can be configured in a zone without violating the policy. However, including an AIX® server in the same zone would violate the configuration rule. (WINDOWS is a registered trademark of Microsoft Corporation AIX is a registered trademark of International Business Machines UNIX is a registered trademark of The Open Group.)

Figure 4:
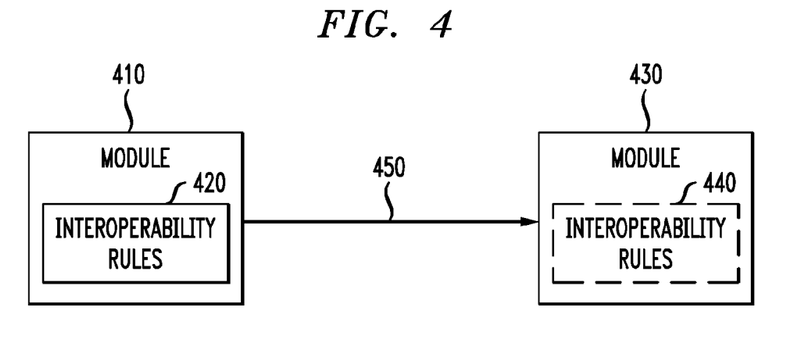
FIG. 4 is a simplified block diagram illustrating an exemplary embodiment of an aspect of the invention in which interoperability rules are read from a module directly.

FIG. 4 is a simplified block diagram illustrating an embodiment of the invention in which interoperability rules are read from a module directly. Here, a module 410 that contains interoperability rules 420 is directly attached (as indicated by arrow 450) to a validation module 430. Rules 440 are discussed below.

Figure 5:
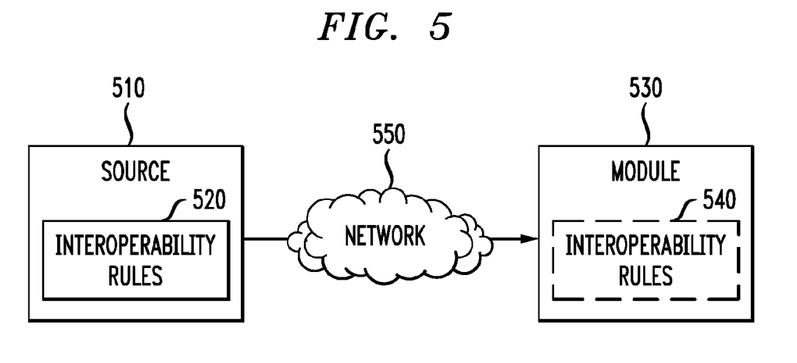
FIG. 5 is a simplified block diagram illustrating an exemplary embodiment of an aspect of the invention in which interoperability rules are from a source indirectly via a network.

FIG. 5 is a simplified block diagram illustrating an embodiment of the invention in which interoperability rules are read from a source indirectly, via a network connection. Here, module 510 that contains interoperability rules 520 is connected to another module 530 via network 550. Rules 540 are discussed below.

In either the embodiment illustrated in FIG. 4 or that illustrated in FIG. 5, it should be noted that elements 410 or 510 may be any location containing interoperability rules, including, but not limited to, a module, a source, or local storage. Furthermore, module 430 or 530 may or may not contain some other interoperability rules 440 or 540 inside, which it may use in conjunction with interoperability rules 420 or 520 in 410 or 510.

Note that when two or more modules are connected to each other by a network (for example FIG. 5), modules may join and leave network asynchronously without explicit coordination among them. Furthermore, a particular module attached to the network may not know about the existence or non-existence of another module attached to the network. One module may discover the existence of another module only when it needs a service provided by it.

Figure 6:
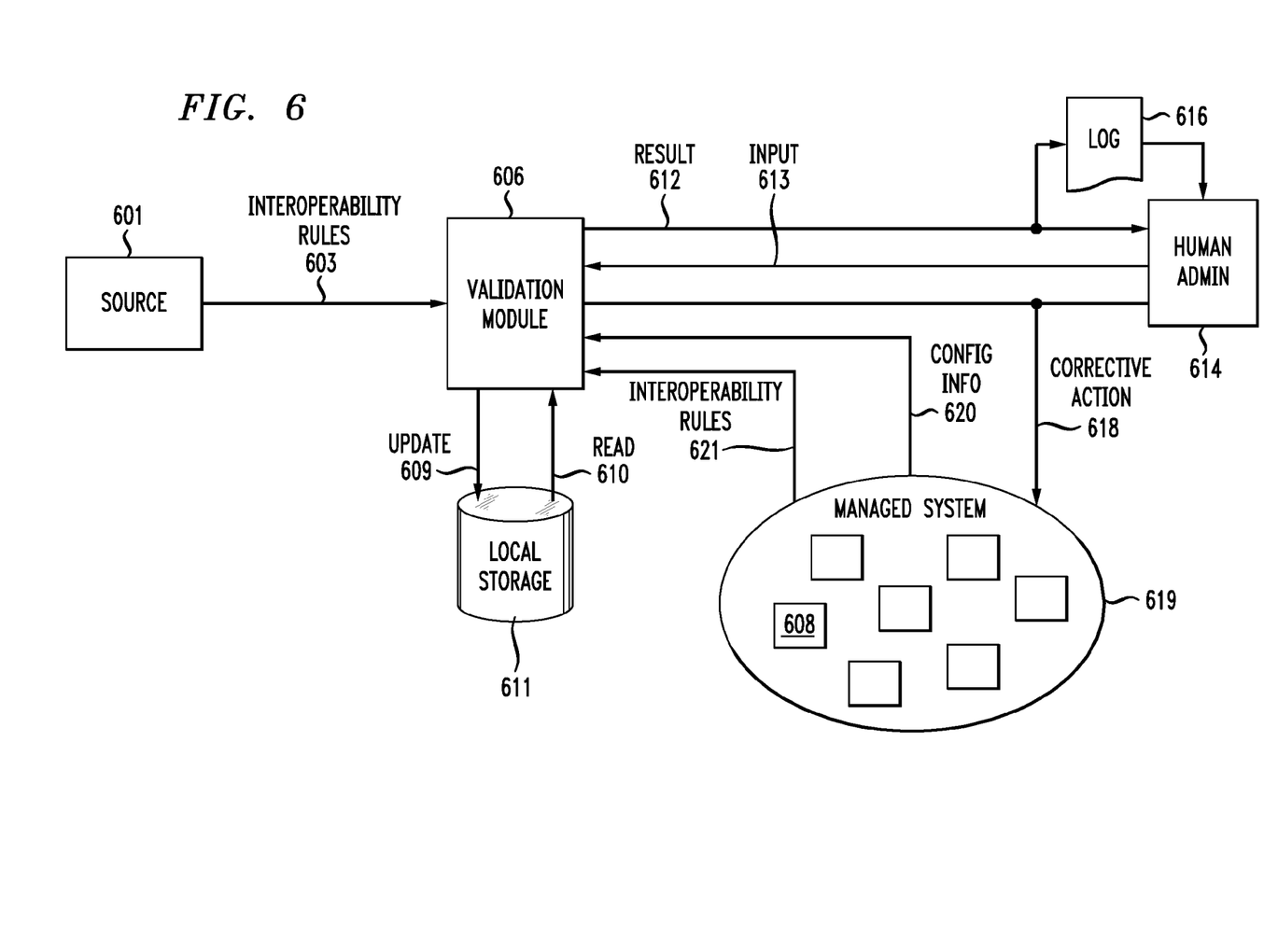
FIG. 6 is a simplified block diagram illustrating an exemplary system in which an embodiment of one or more aspects of the invention may be implemented.

FIG. 6 is a simplified block diagram illustrating an exemplary system within which an exemplary embodiment of an aspect of the invention is implemented. Although this diagram depicts a single validation module 606 located outside of the managed system 619, it is also possible to have additional modules within or outside of the managed system or to have only validation modules within the managed system (for example 608). Likewise, one validation module (for example 608) may communicate with another validation module (for example 606). In one embodiment, the one or more validation modules may be similar to that shown in FIG. 8.

A validation module 606 may retrieve or receive configuration information 620 and/or interoperability rules 621 from the system it manages 619. It may also retrieve interoperability rules 603 from publishers (for example vendors) by subscribing to or, retrieving from well-known service addresses or sources 601. The interoperability rules may also be read 610 from a local storage 611 or input 613 by an administrator 614. A validation module may also itself contain interoperability rules (see 805 on FIG. 8). A validation module may also store 609 interoperability rules on a local storage 611 for later retrieval 610.

The managed system 619 can either be actually deployed systems or design plans for a system to be deployed. In a case where the configuration to be tested differs from the current configuration of the managed system 619, or where the managed system has not yet been fully deployed 619, has not been deployed, the configuration information may be read 610 from local storage 611 or input 613 by the administrator 614. intra-hierarchical-block A validation module 606 will validate the configuration information (for example 620) and interoperability rules (for example 603 or 621) using a method such as that illustrated in FIG. 7. The results 612 may be output to persistent storage (for example a log file) 616 or transmitted directly to an administrator 614 (for example through a console alert or electronic mail message). Additionally, if errors are detected, a validation module 606 and/or a human administrator 614 may invoke one or more corrective actions 618 on a managed system 619, which may itself include one or more validation modules 608. Where a validation module is within a managed system (for example a self-validating module), it may invoke corrective action 618 on itself.

Figure 7:
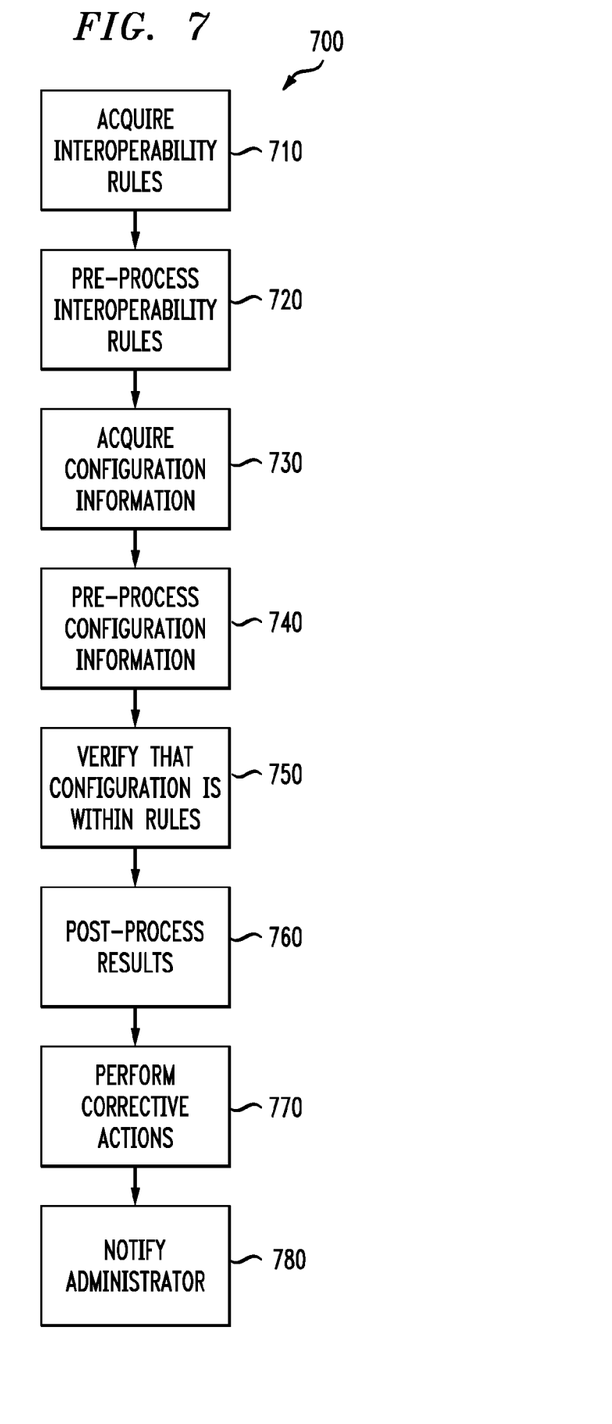
FIG. 7 is a simplified flow diagram illustrating an exemplary method in accordance with an aspect of the invention.

FIG. 7 is a simplified flow diagram illustrating an exemplary method which may be utilized by a validation module (for example 606 in FIG. 6) in accordance with an aspect of the invention. The method begins in step 710 with the acquisition of interoperability rules. A validation module (for example 606 in FIG. 6) may itself contain interoperability rules (for example 805 in FIG. 8) retrieve or receive interoperability rules from one or more modules within the system it manages (619 in FIG. 6 or 803 in FIG. 8), from publishers (for example vendors) by subscribing to or retrieving from online sources (601 in FIG. 6 or 802 in FIG. 8), from a local storage (611 in FIG. 6 or 818 in FIG. 8) or directly from an administrator (614 in FIG. 6).

Step 720 is an optional step which comprises the performance of one or more preprocessing operations on the interoperability rules acquired in Step 710. For example, interoperability rules may be translated from one form into another; interoperability rules coming from a certain vendor may be specified in a vendor-specific format which can be translated into a vendor-neutral format for aggregation with interoperability data from different publishers in a common data format; and/or one publisher may encode interoperability rules in XML for full generality and platform independence, while another publisher may choose to use a database file format so that it may be readily consumed by a DBMS. In a SAN context, the common data format may be a standardized object model defined in SMI-S (Storage Management Initiative Specification).

Additionally, it may be desirable in step 720 to consolidate the interoperability rules and/or remove redundancies. For example, redundancy may occur because the validation module has collected interoperability rules from multiple vendors (for example vendor X specifies the interoperability of its product with vendor Y's product and vendor Y specifies the interoperability of its product with vendor X's). Removing redundant rules will reduce storage space and processing time.

It may also be desirable in step 720 to save interoperability rules to a local storage. For example, in the design phase, one may wish to analyze several possible system configurations under a common set of interoperability rules prior to deployment. Also, interoperability rules may be received rather than retrieved (for example under a subscription model) which will necessitate local storage.

Figure 8:
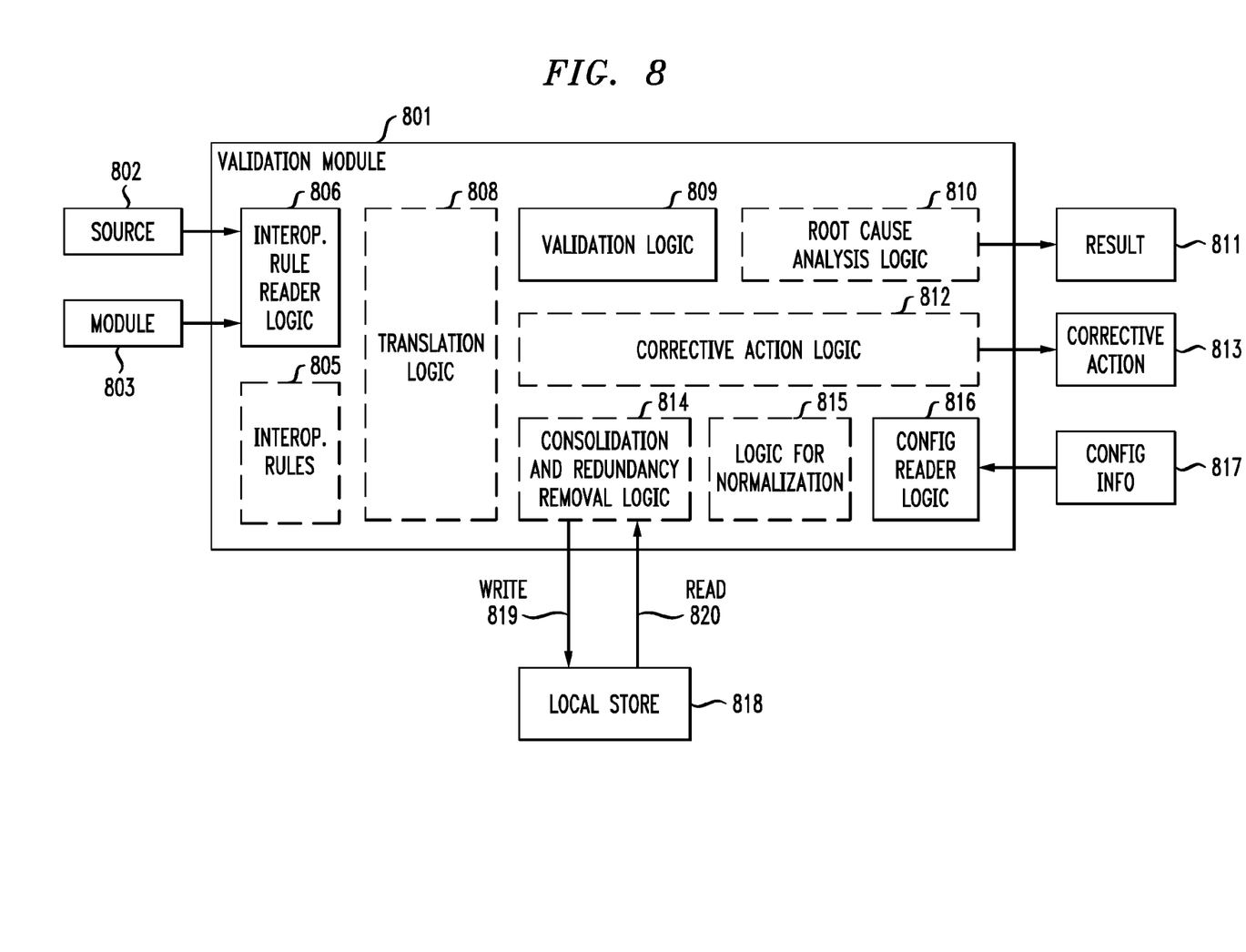
FIG. 8 is a simplified block diagram depicting an exemplary validation module in accordance with an aspect of the invention.

Step 730 includes acquiring configuration information (813 in FIG. 8). This configuration information may be obtained from one or more modules of the managed system (619 in FIG. 6). Especially in cases where the configuration to be analyzed differs from the current configuration of the managed system (for example testing possible configurations of a not-yet-deployed system or possible changes to an existing system), it may be preferable to obtain this information from a local storage (610 in FIG. 6) of from an administrator (613 in FIG. 6).

Step 740 is an optional step which comprises the performance of one or more preprocessing operations on the configuration information acquired in Step 730. This may include, for example, normalizing the configuration data so that its data format is consistent with that of the interoperability rules. For example, in a SAN configuration validation scenario, when a validation module reads a SAN configuration, this data may be converted from a proprietary format specific to a vendor into a vendor-neutral format (for example SMI-S format) before it is checked for correctness.

In Step 750, the validation module checks to see whether the configuration information obtained in Step 730 (and potentially subject to preprocessing in Step 740) conforms to the interoperability rules obtained in Step 710 (and potentially subject to preprocessing in Step 740). This may be implemented in various ways based on the underlying technology. For example, if the interoperability rules are policy-based, then a validation module may invoke a policy engine to check whether the given configuration violates any of the interoperability policies.

Step 760 is an optional step in which a validation module may perform one or more post-processing (optimization) operations on the result obtained in Step 750. For example, it may be helpful to the human administrator for the validation module perform a root cause analysis to not merely indicate the presence of an error but also to suggest what the error is. For example, consider a rule which specifies only modules A, B, C can be in the same group and only modules D, E, F can be in the same group. Now if there is a group containing A, B, C, D, then it may be better to indicate that the group has a violating element D than just that the group caused a violation.

Step 770 is an optional step in which a validation module may attempt to perform corrective actions automatically (for example 615 on FIG. 6). Corrective action may include changing one or more parameter settings (of the validation module itself of another module within the managed system) or retrieving a new version of software from an external server. A validation module may invoke a workflow or some other software module that is able to change the configuration of a managed system to fix the problem. After invoking corrective actions, the validation module may revalidate the configuration to confirm that the number of violations has been reduced. If the validation module could not reduce the number of violations then the validation module may roll back to the previous configuration or may try different corrective actions. Alternatively, instead of automatically performing corrective actions, the validation module may determine suggested corrective actions which are then communicated to a human administrator in Step 780.

Step 780 is an optional step in which a validation module sends at least the result obtained in Step 750 to human administrators (614 in FIG. 6) via console or email. Results may also be stored in a persistent log store (616 on FIG. 6). The console may, for example, display text messages or graphical layout of the configuration with violations marked with different color or special icons along with optional text message describing violations. The results may also include a root cause determined in Step 760 or suggested corrective actions determined in Step 770

It will be appreciated that one or more of the steps described may be performed in response to detecting a change in a configuration of the system. For purposes of example and not limitation, in a typical embodiment, obtaining an interoperability rule might not happen in response to detecting the change in configuration, while obtaining configuration information and comparing it to the interoperability rule might happen in response to detecting the change. Further, step 710, or any of the of their steps, can be repeated as needed.

FIG. 8 is a simplified block diagram depicting an exemplary validation module 801 in accordance with an aspect of the invention. The various logical modules illustrated in FIG. 8 may be implemented in hardware or software. A validation module 801 may comprise interoperability rule reader logic 806 which obtains interoperability rules from sources 802, modules 803, or a local store 818, thus implementing Step 710 of FIG. 7 which may be done, for example, in a manner similar to that shown in FIGS. 4 and 5. Additionally a validation module may itself optionally comprise interoperability rules 805, which would also be accessed by the interoperability rule reader 806.

A validation module may implement aspects of Step 720 of FIG. 7 using optional translation logic 808 and optional consolidation and/or redundancy removal logic 814. Following translation 808 and consolidation 814, interoperability rules may be stored 819 for later retrieval 820 by rule reader logic 806.

A validation module may comprise a configuration reader 816, which obtains configuration information 817 (and Step 730 of FIG. 7) from, for example, a managed system (620 in FIG. 6), a local store 818, or an administrator (613 in FIG. 6). Step 740 of FIG. 7 may be implemented using optional normalization logic 815 and Step 750 of FIG. 7 may be implemented by means of validation logic 809.

The result may be optimized in accordance with Step 760 of FIG. 7 through use of a root cause analyzer 810, whose result 811 may be output (612 in FIG. 6) to a persistent logfile 616 or a human administrator, 614 in accordance with an aspect of Step 780 of FIG. 7. Furthermore, corrective action may be determined by corrective action logic 812 and either performed in accordance with Step 770 of FIG. 7 or provided to the administrator in accordance with Step 780 of FIG. 7.

One or more embodiments of the invention may enable a more flexible solution than afforded by the prior art, for example, where a user can subscribe to various sources of the interoperability rules and get updated information and run an automated tool to validate a design for a new SAN or the configuration of an already-deployed SAN.

A variety of techniques, utilizing dedicated hardware, general purpose processors, firmware, software, or a combination of the foregoing may be employed to implement the present invention. One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 9:
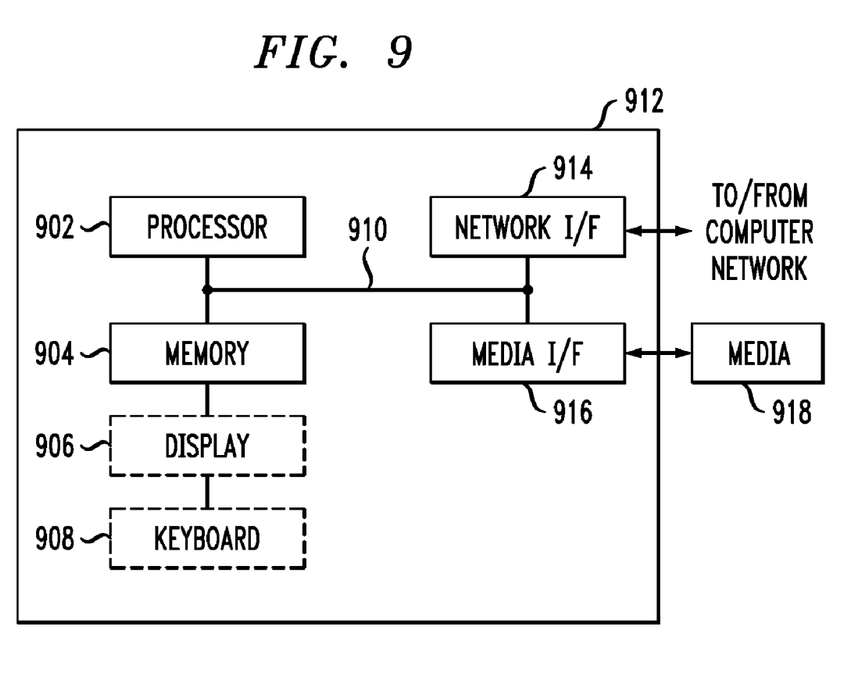
FIG. 9 depicts a computer system that may be useful in implementing one or more aspects and/ort elements of the present invention.

At present, it is believed that one or more embodiments will make substantial use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example) media 918) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 904), magnetic tape, a removable computer diskette (for example media 918), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 902 coupled directly or indirectly to memory elements 904 through a system bus 910. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for validating that a networked system of modules conforms to at least one interoperability rule pertinent to interoperability of at least two of the modules, the method comprising the steps of:
    obtaining the at least one interoperability rule, the at least one rule being encoded in computer-operable format;
    obtaining configuration information pertinent to at least one of the modules, the configuration information being encoded in computer-operable format;
    translating the at least one interoperability rule to another format when the at least one interoperability rule conforms to a format that is incompatible with a format of one or more of said configuration information and another interoperability rule;
    comparing the at least one translated interoperability rule to the configuration information to validate whether the system conforms to the at least one interoperability rule;
    performing a root cause analysis, responsive to said comparing step indicating that the system does not conform to the at least one interoperability rule; and
    performing a corrective action, responsive to said comparing step indicating that the system does not conform to the at least one interoperability rule.

2. The method of claim 1, wherein said at least one interoperability rule comprises at least one compatibility rule and at least one incompatibility rule.

3. The method of claim 2, wherein at least one of the modules is a computing module.

4. The method of claim 2, wherein at least one of the rules are an embedded rule.

5. The method of claim 2, wherein at least one of the steps of obtaining the at least one interoperability rule, obtaining configuration information pertaining to at least one of the modules, translating the at least one interoperability rule; comparing the at least one translated interoperability rule to at least one configuration information to validate whether the system conforms to the at least one interoperability rule, performing a root cause analysis, responsive to said comparing step, and performing a corrective action, responsive to said comparing step is performed by at least one of the modules to which the at least one interoperability rule pertains.

6. The method of claim 2, wherein at least one of the steps of obtaining the at least one interoperability rule, obtaining configuration information pertaining to at least one of the modules, translating the at least one interoperability rule; comparing the at least one translated interoperability rule to at least one configuration information to validate whether the system conforms to the at least one interoperability rule, performing a root cause analysis, responsive to said comparing step, and performing a corrective action, responsive to said comparing step is performed by a module other than the modules to which the at least one interoperability rule pertains.

7. The method of claim 2, wherein at least one of the steps of obtaining the at least one interoperability rule, obtaining configuration information pertaining to at least one of the modules, translating the at least one interoperability rule; comparing the at least one translated interoperability rule to at least one configuration information to validate whether the system conforms to the at least one interoperability rule, performing a root cause analysis, responsive to said comparing step, and performing a corrective action, responsive to said comparing step is performed by a hardware module.

8. The method of claim 2, wherein at least one of the steps of obtaining the at least one interoperability rule, obtaining configuration information pertaining to at least one of the modules, translating the at least one interoperability rule; comparing the at least one translated interoperability rule to at least one configuration information to validate whether the system conforms to the at least one interoperability rule, performing a root cause analysis, responsive to said comparing step, and performing a corrective action, responsive to said comparing step is performed by a software module.

9. The method of claim 2, wherein the step of obtaining the at least one interoperability rule in turn comprises at least one of obtaining at least one interoperability rule from at least one module; and obtaining at least one interoperability rule from at least one publisher.

10. The method of claim 9, wherein the step of obtaining the at least one inoperability rule in turn comprises consolidating a plurality of interoperability rules obtained from multiple publishers.

11. The method of claim 2, wherein at least one of the steps is performed by a module.

12. The method of claim 2, further comprising the additional step of detecting a change in a configuration of the system, wherein at least one of the steps of: (i) obtaining the at least one interoperability rule, (ii) obtaining the configuration information, and (iii) comparing the at least one rule to the information is performed responsive to detecting the change.

13. The method of claim 2, further comprising the additional step of automatically repeating the step of obtaining the at least one interoperability rules.

14. The method of claim 2, further comprising the additional step of storing the at least one interoperability rule.

15. The method of claim 2, further comprising the additional step of removing redundant data regarding the at least one interoperability rule.

16. The method of claim 2 wherein at least one of the modules has not yet been connected to the system.

17. The method of claim 2 wherein at least one component of the system has not been implemented.

18. The method of claim 2 wherein the configuration of the system being analyzed is different from the current configuration of the system.

19. The method of claim 2, wherein the step of performing a corrective action in turn comprises changing at least one parameter setting.

20. The method of claim 2, wherein the step of performing a corrective action in turn comprises retrieving a new version of at least one software module.

21. A computer program product comprising a readable memory medium having computer readable program code, said computer readable program code adapted to be executed to implement a method for validating that a networked system of modules conforms to at least one interoperability rule pertinent to interoperability of at least two of the modules, said method comprising:

providing a system, wherein the system comprises distinct software modules, each of the distinct software modules being embodied on said tangible computer-readable recordable storage medium, and wherein the distinct software modules comprise an input/output module and a validation module;

obtaining at least one interoperability rule, the at least one rule being encoded in computer-operable format, by executing said input/output module on at least one hardware processor;

obtaining configuration information pertaining to at least one of the modules, the configuration information being encoded in computer-operable format, by executing said input/output module on said at least one hardware processor;

translating the at least one interoperability rule to another format when the at least one interoperability rule conforms to a format that is incompatible with a format of one or more of said configuration information and another interoperability rule;

comparing the at least one translated interoperability rule to the configuration information to validate whether the system conforms to the at least one interoperability rule, by executing said validation module on said at least one hardware processor;

performing a root cause analysis, responsive to said comparing step indicating that the system does not conform to the at least one interoperability rule, by executing said validation module on said at least one hardware processor; and performing a corrective action, responsive to said comparing step indicating that the system does not conform to the at least one interoperability rule, by executing said validation module on said at least one hardware processor.

22. A system management module for validating that a networked system of modules conforms to at least one interoperability rule, the system management module comprising:

a memory; and at least one processor coupled to the memory and operative to:

obtain the at least one interoperability rule, the at least one rule being encoded in computer-operable format;

obtain configuration information pertinent to at least one of the modules, the configuration information being encoded in computer-operable format;

translate the at least one interoperability rule to another format when the at least one interoperability rule conforms to a format that is incompatible with a format of one or more of said configuration information and another interoperability rule;

compare the at least one translated interoperability rule to at least one configuration information to validate whether the system conforms to the at least one interoperability rule;

perform a root cause analysis, responsive to said compare step indicating that the system does not conform to the at least one interoperability rule; and perform a corrective action, responsive to said compare step indicating that the system does not conform to the at least one interoperability rule.

23. An article of manufacture for validating that a networked system of modules conforms to at least one interoperability rule, comprising a readable memory medium having instructions stored thereon, such that said instructions, when carried out by a processing device, enable the processing device to implement the steps of:

obtaining the at least one interoperability rule, the at least one rule being encoded in computer-operable format, by executing said instructions on said processing device;

obtaining configuration information pertinent to at least one of the modules, the configuration information being encoded in computer-operable format, by executing said instructions on said processing device;

translating the at least one interoperability rule to another format when the at least one interoperability rule conforms to a format that is incompatible with a format of one or more of said configuration information and another interoperability rule;

comparing the at least one translated interoperability rule to at least one configuration information to validate whether the system conforms to the at least one interoperability rule, by executing said instructions on said processing device;

performing a root cause analysis, responsive to said compare step indicating that the system does not conform to the at least one interoperability rule, by executing said instructions on said processing device; and performing a corrective action, responsive to said comparing step indicating that the system does not conform to the at least one interoperability rule, by executing said instructions on said processing device.

* * * * *